United States Patent [19]

Kehr

[11] 4,008,341
[45] Feb. 15, 1977

[54] CURABLE LIQUID POLYMER COMPOSITIONS

[75] Inventor: Clifton L. Kehr, Silver Spring, Md.

[73] Assignee: W. R. Grace & Co., New York, N.Y.

[22] Filed: Jan. 10, 1975

[21] Appl. No.: 540,057

Related U.S. Application Data

[63] Continuation-in-part of Ser. Nos. 92,200, Nov. 23, 1970, and Ser. No. 92,311, Nov. 23, 1970, and Ser. No. 470,091, May 15, 1974, which is a continuation-in-part of Ser. No. 92,309, Nov. 23, 1970, abandoned, which is a continuation-in-part of Ser. No. 766,948, Oct. 11, 1968, Pat. No. 3,623,879.

[52] U.S. Cl. .............................. 427/44; 96/115 P; 204/159.22; 427/54
[51] Int. Cl.$^2$ .................................. B05D 3/06
[58] Field of Search .......... 427/44, 54; 204/159.22; 96/115 P

[56] References Cited

UNITED STATES PATENTS

| | | | |
|---|---|---|---|
| 3,361,842 | 1/1968 | Applegath et al. | 204/159.22 |
| 3,403,172 | 9/1968 | Jordan et al. | 204/159.22 |
| 3,403,187 | 9/1968 | Oswald et al. | 427/44 |
| 3,468,861 | 9/1969 | Tietz et al. | 204/159.22 |
| 3,506,626 | 4/1970 | Warner et al. | 427/44 |
| 3,535,193 | 10/1970 | Prince | 427/44 |

OTHER PUBLICATIONS

Stacey et al. Organic Reactions, vol. 13, Adams et al., Editors John Wiley and Sons Inc. NY 1963, pp. 150–152, 165–167, 171, 179, 180, 182, 184, 187, 268, 270–272, 288.

Primary Examiner—John H. Newsome
Attorney, Agent, or Firm—Richard P. Plunkett; Kenneth E. Prince

[57] ABSTRACT

This invention relates to a new curable composition which includes a liquid unsaturated component having at least two vinyl addition polymerizable groupings per average molecule and a polythiol component having a multiplicity of —SH functional groups per average molecule which cures to a solid polythioether in the presence of a free radical generator. When the free radical generator is actinic radiation, e.g. U. V. light, a photocuring rate accelerator, e.g. benzophenone is added to the composition. The cured product can be used as a coating, sealant, adhesive or molded article.

19 Claims, No Drawings

CURABLE LIQUID POLYMER COMPOSITIONS

This application is a continuation-in-part of my copending applications having Ser. No. 92,200 filed Nov. 23, 1970; Ser. No. 92,311 filed Nov. 23, 1970, and application having Ser. No. 470,091, filed May 15, 1974, which is a continuation in part of application having Ser. No. 92,309 filed Nov. 23, 1970, now abandoned assigned to the same assignee, incorporated by reference herein, which in turn is a continuation-in-part of application having Ser. No. 766,948, filed Oct. 11, 1968, now U.S. Pat. No. 3,623,879, assigned to the same assignee, all incorporated herein by reference.

This invention relates to a new curable composition which includes a liquid unsaturated component having at least two vinyl addition polymerizable groupings per average molecule and a polythiol component having a multiplicity of —SH functional groups per average molecule. A photocuring rate accelerator is added to the composition when the curing is carried out using actinic radiation, e.g. U. V. light.

It is well known in the art that addition polymerizable vinyl monomers may be polymerized by various means. For example, they may polyermize on exposure to high energy ionizng radiation as shown in U.S. Pat. Nos. 3,247,012 and 3,437,514. They can be photopolymerized in the presence of a photoinitiator as shown in reference texts such as J. Kosar, Light-Sensitive Systems, J. Wiley and Sons, N.Y., 1965, Chap. 5, pp. 158–193; U.S. Pat. No. 2,722,512; U.S. Pat. No. 2,760,863; and the like. They can also be polymerized by exposure to chemical free radical generating agents. See "Preparation Methods of Polymer Chemistry", 2nd Edition, W. R. Sorenson and T. W. Campbell, Interscience Publishers, 1968, pp. 203–264. The reaction mechanism which predominates in such polymerization can be shown as follows, using methyl acrylate as an exemplary monomer, leading to a linear hydrocarbon backbone and oxygen-containing branches on alternating carbon atoms:

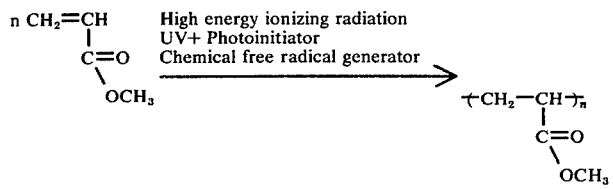

If a poly(acrylate) ester (e.g., ethylene glycol diacrylate) is substituted for all or part of the methyl acrylate in this example, polymerization between adjacent backbone chains can occur and a crosslinked, insoluble network structure will be obtained.

The addition photopolymerizable vinyl monomer systems of the prior art, however, suffer from several technical problems which are disadvantages in commercial applications. One such problem, for example, is that the polymerization is strongly inhibited by atmospheric oxygen dissolved in the composition or in contact with the surface thereof. In thin film applications such as for printing plates, coatings, etc., this leads to a general cumbersome and costly requirement i.e., use of an inert gaseous environment ($N_2$, argon, $CO_2$ and the like) during the course of the photopolymerization. Another problem is, the high degree of volume contraction (sometimes in excess of 30%) during vinyl photopolymerization which leads to excessive shrinkage in the final product, sometimes resulting in distortion of the product, loss of adhesion to substrates and the like. Another deficiency of the compositions of the prior art lies in excessive amounts of heat (exotherm) liberated during the course of the photopolymerization. Still another deficiency is in the unpredictability of the induction period that precedes onset of photopolymerization, thereby leading to poor control and reproducibility of the experimental conditions or to unacceptably long and costly exposure times, or both.

It has now been found that numerous defects of the prior art described above may be substantially improved or effectively overcome by practice of the present invention which provides new curable compositions which are curable to solid resins or elastomers. These compositions contain particular polyenes which are curable by polythiols to solid resinous or elastomeric polythioether containing products.

In the present invention, the unsaturated polyene may be represented by the formula:

$$[A]-(X)_m$$

wherein $m$ is an integer of at least 2,

and [A] is a polyvalent organic moiety free of reactive carbon to carbon unsaturation and of highly water-sensitive members; and consisting of atoms selected from the group consisting of carbon, hydrogen, oxygen, nitrogen, chlorine, bromine, fluorine, phosphorous, and silicon; and R is a radical selected from the group consisting of hydrogen, phenyl, and alkyl having from 1 to 9 carbon atoms. The polyenes of the instant invention have a molecular weight in the range of about 170 to 20,000 and are liquid at or below 70° C.

The polythiol component has a molecular weight in the range from about 94 to about 20,000 and the general formula:

$$[R_8]-(SH)_n$$

wherein $[R_8]$ is a polyvalent organic moiety and n is an integer of at least 2. The polyene/polythiol mole ratios are selected so as to provide a solid, self-supporting cured polythioether product when exposed to a free radical generating agent. To obtain the maximum strength, solvent resistance, creep resistance, heat resistance and freedom from surface tackiness, the reaction components consisting of the polyenes and polythiols of this invention are formulated in such a manner as to give a solid, crosslinked, three dimensional network polythioether polymer system on curing. In order to achieve such infinite network formation the individual polyenes and polythiols must each have a functionality of at least 2 and the sum of the functionalities of the polyene and polythiol components must always be greater than 4. Blends and mixtues of polyenes and polythiols containing said functionalities are also operable herein.

In summary, by admixing particular polyenes containing two or more vinyl addition polymerizable unsaturated carbon to carbon bonds located terminal from the main chain with a polythiol containing two or more thiol groups per molecule and thereafter exposing said liquid mixture to a free radical generating agent, e.g. high energy ionizing radiation; actinic radiation such as U. V. light or a chemical free radical generating agent such as benzoyl peroxide, there is provided an essentially odorless solid elastomeric or resinous polymeric cured polythioether product.

Polythiol as used herein refers to simple or complex organic compounds having a multiplicity of pendant or terminally positioned —SH functional groups per average molecule.

On the average the polythiol must contain 2 or more —SH groups/molecule and have a viscosity range of essentially 0 to 20 million centipoises (cps) at 70° C as measured by a Brookfield Viscometer either alone or when in the presence of an inert solvent, aqueous dispersion or plasticizer. Operable polythiols in the instant invention usually have molecular weights in the range about 94 to about 20,000, and preferably from about 100 to about 10,000. The polythiols operable in the instant invention may be exemplified by the general formula $R_8$-(SH)$_n$ where $n$ is at least 2 and $R_8$ is a polyvalent organic moiety. Thus $R_8$ may contain cyclic groupings and hetero atoms such as N, P or O and primarily contains carbon-carbon, carbon-hydrogen, carbon-oxygen, or silicon-oxygen containing chain linkages.

One class of polythiols operable with polyenes to obtain essentially odorless polythioether products are esters of thiol-containing acids of the formula HS—R$_9$—COOH where $R_9$ is an organic moiety with polyhydroxy compounds of structure $R_{10}$-(OH)$_n$ where $R_{10}$ is an organic moiety and $n$ is 2 or greater. These components will react under suitable conditions to give a polythiol having the general structure:

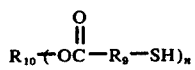

where $R_9$ and $R_{10}$ are organic moieties and $n$ is 2 or greater.

Certain polythiols such as the aliphatic monomeric polythiols (ethane dithiol, hexamethylene dithiol, decamethylene dithiol, tolylene-2,4-dithiol, etc. and some polymeric polythiols such as a thiol-terminated ethylcyclohexyl dimercaptan polymer, etc. and similar polythiols which are conveniently and ordinarily synthesized on a commercial basis, although having obnoxious odors, are operable in this invention but many of the end products are not widely accepted from a practical, commercial point of view. Examples of the polythiol compounds preferred for this invention because of their relatively low odor level include but are not limited to esters of thiogylcolic acid (HS-CH$_2$COOH), α-mercaptopropionic acid (HS-CH(CH$_3$)-COOH and β-mercaptopropionic acid (HS-CH$_2$CH$_2$COCH) with polyhydroxy compounds such as glycols, triols, tetraols, pentaols, hexaols, etc. Specific examples of the preferred polythiols include but are not limited to ethylene glycol bis (thioglycolate), ethylene glycol bis (β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis (β-mercaptopropionate) which is prepared from polypropylene-ether glycol (e.g. Pluracol P2010, Wyandotte Chemical Corp.) and β-mercaptopropionic acid by esterification.

The preferred polythiol compounds are characterized by a low level of mercaptan-like odor initially, and after reaction, give essentially odorless polythioether end products which are commercially attractive and practically useful resins or elastomers for both indoor and outdoor applications.

Prior to curing, the curable polymer may be formulated for use as 100% solids, or disposed in organic solvents, or as solutions, dispersions or emulsions in aqueous media.

The curable polymer compositions prior to curing may readily be pumped, poured, siphoned, brushed, sprayed, doctored, or otherwise handled as desired. Following application, curing in place to a solid resin or elastomer may be effected either very rapidly or extremely slowly as desired by manipulation of the compounding ingredients and the method of curing.

The liquid polythioether-forming components and compositions, prior to curing, may be admixed with or blended with other monomeric and polymeric materials such as thermoplastic resins, elastomers or thermosetting resin monomeric or polymeric compositions. The resulting blend may be subjected to conditions for curing or co-curing of the various components of the blend to give cured products having unusual physical properties.

Although the mechanism of the curing reaction is not completely understood, it appears most likely that the curing reaction may be initiated by most any free radical mechanism which dissociates or abstracts a hydrogen atom from an SH group, or accomplishes the equivalent thereof. Generally the rate of the curing reaction may be increased by increasing the temperature of the composition at the time of initiation of cure. In many applications, however, the curing is accomplished conveniently and economically by operating at ordinary room temperature conditions. Thus when using U.V. to cure a coating, it is possible merely to photoexpose the polyene, polythiol and photocuring rate accelerator admixture at ambient conditions and obtain a photocured solid elastomeric or resinous product.

The free radical generating agent used to cure the composition of the instant invention can be in various forms including high energy radiation, actinic radiation and a chemical free radical generating agent.

By proper choice of type of high energy radiation source for initiation, the curing period required for conversion of the polyene/polythiol composition from the liquid to the solid state may be varied greatly as desired. The curing period may vary from about a second or less to about several hours or more.

The present composition may be cured by high energy bombardment such as by nuclear particles, as well as high energy radiation having a wave length shorter than about 2000 A.

A class of high energy bombardment includes energetic electrons such as those derived from isotopes such as strontium-90, or intense electron beams produced by particle accelerators. Electron beam curing is most useful in applications where very rapid and economical rates are desired. By way of example, in some systems curing periods of less than about one second may be experienced using a total radiation dose of less than about 0.25 megarads.

A second class of high energy bombardment includes x-rays. X-rays are useful in that relatively thick sections of curable composition may be penetrated during the curing process.

A third class of high energy bombardment includes energetic radiation derived primarily from radioactive isotopes, chemonuclear methods and the like. Included in this class are ionizing radiation particles such as alpha rays, neutrons, protons and the like as well as gamma radiation.

By proper choice of type and concentration of photocuring rate accelerator for initiation, the curing period required for conversion of the polyene/polythiol composition to a cured polythioether by U.V. light may be varied greatly as desired. In combination with suitable accelerators or retarders, the curing period may vary from about a second or less to about several hours or more. In general, short curing periods are achieved in applications where thin films of photocurable composition are required, such as in the field of coatings whereas, the long curing periods are achieved and desired where more massive layers of composition are required, such as in the field of elastomeric sealants.

A class of actinic light useful herein is ultraviolet light and other forms of actinic radiation which are normally found in radiation emitted from the sun or from artificial sources such as Type RS Sunlamps, carbon arc lamps, xenon arc lamps, mercury vapor lamps, tungsten halide lamps and the like. Ultraviolet radiation may be used most efficiently if the photocurable polyene/polythiol composition contains a suitable photocuring rate accelerator. Curing periods may be adjusted to be very short and hence commercially economical by proper choice of ultraviolet source, photocuring rate accelerator and concentration thereof, temperature and molecular weight, and reactive group functionality of the polyene and polythiol. Curing periods of less than about 1 second duration are possible, especially in thin film applications such as desired for example in coatings and adhesives.

It is understood to be within the scope of this invention that the photocuring rate accelerator may be present as a separate and distinct component such as azobenzene; as a mixture of two or more separate components, such as benzophenone, benzanthrone, anthrone, and dibenzosuberone; carbon tetrachloride and phenanthrene; and the like, or in a chemically combined form within the molecular structure of either the polyene or the polythiol.

It is further understood that the polyene, the polythiol or the photocuring rate accelerator may be formed in situ in the photocurable composition without departing from the spirit of this invention.

Specifically useful herein are chemical photocuring rate accelerators such as benzophenone, acetophenone, acenaphthene-quinone, o-methoxy benzophenone, Thioxanthen-9-one, xanthen-9-one, 7-H-Benz[de]anthracen-7-one, dibenzosuberone, 1-naphthaldehyde, 4,4'-bis(dimethylamino) benzophenone, fluorene-9-one, 1'-acetonaphthone, 2'-acetonaphthone, anthraquinone, 1-indanone, 2-tert-butyl anthraquinone, valerophenone, hexanophenone, 8-phenyl-butyrophenone, p-morpholinopropiophenone, 4-morpholinobenzophenone, 4'-morpholinodeoxybenzoin, p-diacetylbenzene, 4-aminobenzophenone, 4'-methoxyacetophenone, benzaldehyde, α-tetralone, 9-acetylphenanthrene, 2-acetylphen-anthrene, 10-thioxanthenone, 3-acetylphenanthrene, 3-acetylindole 1,3,5-triacetylbenzene, and the like including blends thereof, to greatly reduce the exposure times.

The curing rate accelerators are usually added in an amount ranging from about 0.0005 to about 50% by weight of the photocurable composition, with a preferred range being from about 0.05 to about 25% by weight. Preferred photocuring rate accelerators are the aldehyde and ketone carbonyl compounds having at least one aromatic nucleus attached directly to the

group.

By proper choice of type and concentration when using a chemical free radical generating agent, the curing period required for conversion of the polyene/polythiol composition to a solid, cured polythioether may be varied greatly as desired. In combination with suitable accelerators or retarders, the curing period in the presence of various chemical free radical generating agents may vary from about a second or less to about several hours or more. In general, short curing periods are achieved in applications where thin films of curable composition are required, such as in the field of coatings whereas the long curing periods are achieved and desired where more massive layers of composition are required, such as in the field of elastomeric sealants.

Chemical free radical generating reagents operable in this invention include oxygen; ozone, chlorine; organic peroxides and hydroperoxides; peracids; persulfates; inorganic peroxides; and azo compounds such as azobisisovaleronitrile. Certain of these compounds may be made more effective and efficient if used in conjunction with co-agent curing rate accelerators. Examples of accelerated systems may include benzoyl peroxide with dimethylaniline as an accelerator; cumene hydroperoxide with cobalt naphthenate as an accelerator; and the like. Included in this class are reagents or components which are generated in situ in the composition. Curing periods may be varied, but the reactions are generally relatively fast. Conversions from liquid to solid state may occur within a few seconds to a few minutes.

A chemical free radical generating agent is usually added in an amount ranging from about 0.0005 to about 25% by weight of the curable composition, with the preferred range being from about 0.05 to about 5% by weight.

Conventional curing inhibitors or retarders which may be used in order to stabilize the components or curable compositions so as to prevent premature onset of curing may include hydroquinone; p-tert-butyl catechol; 2,6-ditertbutyl-p-methylphenol; phenothiazine; N-phenyl-2-naphthylamine; inert gas atmospheres such as helium, argon, nitrogen and carbon dioxide; vacuum; and the like.

It is further understood that the polyene and the polythiol may be formed in situ in the curable composition without departing from the spirit of this invention.

To obtain the maximum strength, solvent resistance, creep resistance, heat resistance and freedom from tackiness, the reaction components consisting of the polyenes and polythiols of this invention are formulated in such a manner as to give solid, crosslinked, three dimensional network polythioether polymer systems on curing. In order to achieve such infinite network formation the individual polyenes and polythiols must have a functionality of at least 2 and the sum of the functionalities of the polyene and polythiol components must always be greater than 4. Blends and mixtures of the polyenes and the polythiols containing said functionality are also operable herein.

The compositions to be cured, i.e., (converted to solid resins or elastomers) in accord with the present invention may, if desired, include such additives as antioxidants, accelerators, dyes, inhibitors, activators, fillers, pigments, anti-static agents, flame-retardant agents, thickeners, thixotropic agents, surface-active agents, viscosity modifiers, extending oils, plasticizers, tackifiers and the like within the scope of this invention. Such additives are usually preblended with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in effective quantities up to 500 parts or more per 100 parts polymer by weight and preferably about 0.0005 to about 300 parts on the same basis.

The compounding of the components prior to curing may be carried out in several ways. For example, the polyene, the polythiol and any other additives may be admixed and charged to an aerosol can, drum, tube, or cartridge for subsequent use.

Another useful method of compounding is to prepare in an ambient atmosphere by conventional mixing techniques but in the absence of a free radical generating agent a composition consisting of polyene, antioxidant (to inhibit spontaneous oxygen-initiated curing), polythiol, UV sensitizer or photocuring rate accelerator if necessary and other inert additives. This composition may be stored in the dark for extended periods of time, but on exposure to a free radical generating agent (e.g. ultraviolet light, high energy radiation, etc.) will cure controllably and in a very short time period to solid polythioether products.

The mole ratio of ene/thiol groups for preparing the curable composition is from about 0.2/1 to about 5/1, and desirably about .75/1 to about 1.5/1 group ratio, said ratios to be chosen in each individual composition so that a crosslinked solid product is obtained after completion of the photocuring reaction.

The following examples will aid in explaining but expressly not limit the instant invention. Unless otherwise noted, all parts and percentages are by weight.

Shore A and Shore D hardness were measured in accord with the method set out in ASTM-D-2240.

EXAMPLES USING UV LIGHT AS THE FREE RADICAL GENERATING AGENT

EXAMPLE 1

4 moles of trimethylol propane triacrylate commercially available from Sartomer Resins, Inc. were admixed with 3 moles of pentaerythritol tetrakis ($\beta$-mercaptopropionate) commercially available from Carlisle Chemical Co. under the tradename "Q-43" and 1% by weight of the admixture of benzophenone. The admixture was poured into a tray (3/16 inch thick layer) and was exposed to a 275 watt Type RS sun lamp delivering 4000 microwatts/$cm^2$ at the surface of the admixture. A skin cure was observed in 12 seconds and in 95 seconds, the admixture had cured clear through to a smooth clear, colorless, very tough solid having a Shore D hardness of 76.

EXAMPLE 2

Example 1 was repeated except that the benzophenone was omitted from the admixture. The admixture on exposure to the UV sun lamp evidenced a skin cure after 1.5 minutes and after 3.3 minutes cured to a clear, colorless, solid having a Shore A hardness of 55.

EXAMPLE 3

Example 1 was repeated except that the pentaerythritol tetrakis ($\beta$-mercaptopropionate) was omitted from the admixture. The admixture was exposed to the UV sun lamp for 2 hours without any evidence of photopolymerization. After irradiating the sample continuously overnight (about 17 hours total) the sample polymerized partially to an amber colored solid having liquid top and bottom surfaces (evidence of oxygen inhibition of polymerization).

EXAMPLE 4

4 moles of trimethylol propane trimethacrylate commercially available from Sartomer Resins, Inc. was admixed with 3 moles of pentaerythritol tetrakis ($\beta$-mercaptopropionate) and 1% by weight of the admixture of benzophenone. The admixture was placed in a tray in a layer 3/16 inch thick and exposed to a 275 watt Type RS sun lamp delivering 4000 microwatts/$cm^2$ at the surface of the admixture. In 22 seconds, a skin cure was observed and in 77 seconds the admixture had cured clear through to a clear, colorless, smooth, very tough solid having a Shore D hardness of 75.

EXAMPLE 5

Example 4 was repeated except that the benzophenone was omitted from the admixture. On exposure to the sun lamp the admixture acquired a skin cure in 2.5 minutes and cured clear through in 4 minutes to a Shore A hardness of 92.

EXAMPLE 6

Example 4 was repeated except that the pentaerythritol tetrakis ($\beta$-mercaptopropionate) was omitted from the admixture. The admixture after exposure to the sun lamp for more than 2 hours showed no sign of photopolymerization to a solid product.

EXAMPLE 7

2 moles of diethylene glycol diacrylate commercially available from Borden Chemical Co. were admixed with 1 mole of pentaerythritol tetrakis ($\beta$-mercaptopropionate) and 1% by weight of the admixture of benzophenone. The admixture was placed in a tray to give a 3/16 inch thick layer of the admixture, and exposed to a 275 watt Type RS sun lamp delivering 4000 microwatts/$cm^2$ at the surface of the admixture. In 10 seconds a skin cure formed and in about 100–140 seconds the admixture cured clear through to a clear, colorless, rubbery solid having a Shore A hardness of 67.

EXAMPLE 8

Example 7 was repeated except that the benzophenone was omitted from the admixture. A skin cure formed in 2.3 minutes and the admixture cured clear through in about 3.3–4.5 minutes to a Shore A hardness of 57.

EXAMPLE 9

Example 7 was repeated except that the pentaerythritol tetrakis (β-mercaptopropionate) was omitted from the admixture. The admixture after exposure to the sun lamp for 2 hours showed no sign of photopolymerization. After continuous irradiation overnight (total about 17 hours) the composition polymerized to yield a crumbly, yellow brittle, foamed solid product.

EXAMPLE 10

2 moles of diethylene glycol dimethacrylate commercially available from Borden Chemical Co. were admixed with 1 mole of pentaerythritol tetrakis (β-mercaptopropionate) and 1% by weight of the admixture of benzophenone. The admixture was poured into a tray to give a 3/16 inch layer of the admixture and exposed to a 275 watt type RS sun lamp delivering 4000 microwatts/cm$^2$ at the surface of the admixture. In 6.25 minutes a skin cure formed and in about 8.35–13 minutes the admixture cured clear through to a colorless, rubber solid having a Shore A hardness of 73.

EXAMPLE 11

Example 10 was repeated except that the benzophenone was omitted from the admixture. In 10 minutes a skin cure formed and a clear through cure was obtained in about 14 minutes. The resultant clear, colorless, slightly rubbery solid had a Shore A hardness of 70 after 90 minutes exposure.

EXAMPLE 12

Example 10 was repeated except that the pentaerythritol tetrakis (β-mercaptopropionate) was omitted from the admixture. The admixture, after a 2 hour exposure to the sun lamp, showed no sign of photopolymerization to a solid product.

EXAMPLE 13

7.4 grams poly(oxyethyleneether) glycol diacrylate (M.W. about 370) commercially available from Sartomer Resins, Inc. under the trade name SR 210 was mixed with 4.9 g. pentaerythritol tetrakis (β-mercaptopropionate) and 0.024 g. dibenzosuberone as the photocuring rate accelerator. The homogeneous composition was then exposed to radiation from a 275 watt Type RS sun lamp at a surface UV radiation intensity of 4000 microwatts/cm$^2$. During 5 minutes exposure the 60 mil thick specimen cured from the top surface downward and solidified to a clear colorless product. After 6 minutes exposure, the product had a Shore A hardness of 55, and the surfaces of the specimen were smooth, solid and essentially tack-free.

The experiment was repeated except that the amounts of components were as follows:

| | |
|---|---|
| poly(oxyethyleneether) glycol diacrylate | 7.4 g. |
| dibenzosuberone | 0.014 g. |
| pentaerythritol tetrakis (β-mercaptopropionate) | none |

Upon exposure under the same radiation conditions, the sample was very sluggish to photopolymerize. Thickening was observed first at the bottom central portion of the mold (where oxygen concentration was lowest) and then hardened slowly over a 20 minute period in an upward and outward direction. The top surface (in contact with air) was still sticky and wet (unpolymerized) after 30 minutes exposure, at which time the experiment was terminated.

A comparison of these two experiments shows the superiority of the photocuring reaction accomplished by the use of the polythiol-containing composition of this invention. The reaction is smoother, faster and is conveniently carried out even in the presence of air (oxygen).

EXAMPLE 14

2 moles of trimethylol propane triacrylate commercially available from Sartomer Resins, Inc. were admixed with 3 moles of ethyleneglycol bis (β-mercaptopropionate) commercially available from Carlisle Chemical Co. under the tradename "E-23" and 1% by weight of the admixture of dibenzosuberone. The admixture was placed in a tray to give a 3/16 inch thick layer and exposed to a 275 watt Type RS sun lamp delivering 4000 microwatts/cm$^2$ at the surface of the admixture. In about 20–40 seconds a skin cure formed and in about 6 minutes the admixture cured clear through to a clear, colorless solid.

When the example was repeated except that the ethyleneglycol bis (β-mercaptopropionate) was omitted from the admixture, no curing was noted in 2 hours.

EXAMPLE 15

2 moles of diethylene glycol diacrylate were admixed with 1 mole of pentaerythritol tetrakis (β-mercaptopropyl) ether and 1% by weight of the admixture of benzophenone. A 3/16 inch thick layer of the admixture was poured into a tray and exposed to a 275 watt Type RS sun lamp delivering 4000 microwatts/cm$^2$ at the admixture's surface. A skin cure was observed in 15–20 seconds and in about 3 minutes, the admixture had cured clear through to a smooth, clear, colorless solid.

When the example was repeated except that the pentaerythritol tetrakis (β-mercaptopropyl)ether was omitted, no curing was observed in 2 hours.

EXAMPLE 16

1 mole of trimethylol propane trimethacrylate was admixed with 1 mole of tris (β-mercaptopropionate) ester of tris (2-hydroxyethyl) isocyanurate and 1% by weight of the admixture of acetophenone. A 3/16 inch thick layer of the admixture was poured into a tray and exposed to a 275 watt Type RS sun lamp delivering 4000 microwatts/cm$^2$ at the admixture's surface. A skin cure was observed in less than 45 seconds and in about 8–10 minutes, the admixture had cured clear through to a smooth, clear, colorless solid.

When the example was repeated except that the tris (β-mercaptopropionate)ester of tris(2-hydroxyethyl)

isocyanurate was omitted from the admixture, no curing was observed in 2 hours.

EXAMPLE 17

The admixture of Example 1 was coated on the following surfaces to a thickness of about 2 mils: aluminum, tin free steel, ceramic, brick, paper, leather, cinder block, polyvinyl chloride film, polyethylene terephthalate, glass, cotton fabric, non-woven glass mat, cellophane, plywood, and claycoated paper board. The coated articles were exposed for 2 minutes to the UV radiation (surface intensity about 5000 microwatts/cm²) from a 2000 watt pulsed xenon arc lamp. Following this exposure the clear, tough crosslinked solid coating adhered well to the substrates and imported to them a degree of water repellancy and soil resistance.

EXAMPLE 18

To a glass resin kettle immersed in a water bath and equipped with a Teflon stirrer was charged 130 grams of "Multrathane" F-196 (an isocyanate terminated polyether prepolymer liquid resin having a molecular weight in the range 1610–1790) commercially available from Mobay Chemical Company, 16 resin) commercially available from Mobay Chemical Company, 16 grams of propylene glycol monoacrylate having the following structure:

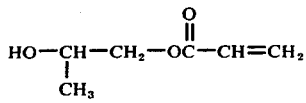

along with 5 drops of dibutyl tin dilaurate as a catalyst. The kettle was closed to exclude moisture, agitation was commenced and the mixture was reacted for 1½ hours at 70° C. 10 grams (a large excess over theory) of water were added to the reaction to chain extend the polymer by reaction with remaining -NCO groups and the reaction was continued for 1½ hours at 70° C, giving a total reaction time of 3 hours at 70° C. The thus formed mixture of chain extended urethane/urea-containing acrylate terminated polyene, i.e.,

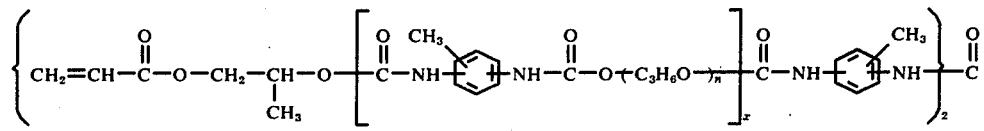

and urethane-containing acrylate terminated polyene, i.e.,

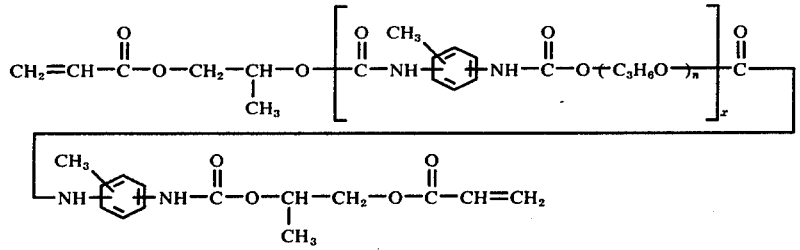

wherein both formulas $x$ is about 1 and $n$ is 21–25 will be referred to hereinafter as Polyene A.

To a 2 ounce glass jar was added 10 grams (0.0038 mole) of acrylate terminated Polyene A and 0.9 gram (0.0019 mole) of commercially available pentaerythritol tetrakis (mercaptopropionate). 0.5 gram of acetophenone as a photocuring rate accelerator was added to the mixture and the mixture was placed outdoors on a window ledge and exposed to UV radiation from the sun. After 15 minutes the mixture cured to a hard solid polythioether.

EXAMPLE 19

To a glass resin kettle immersed in a water bath and equipped with a Teflon stirrer was charged 130 grams of "Multrathane" F-196 (an isocyanate terminated polyether prepolymer liquid resin) commercially available from Mobay Chemical Company, 24 grams of propylene glycol monoacrylate having the following sturcture:

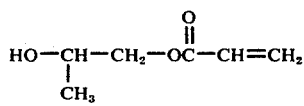

along with 5 drops of dibutyl tin dilaurate as a catalyst. The kettle was closed to exclude moisture, agitation was commenced and the mixture was reacted for 1½ hours at 70° C. 10 grams of water were added to the reaction and the stirring was continued for 1½ hours at 70° C., giving a total reaction time of 3 hours at 70° C. The thus formed urethane-containing acrylate terminated polyene had the structure

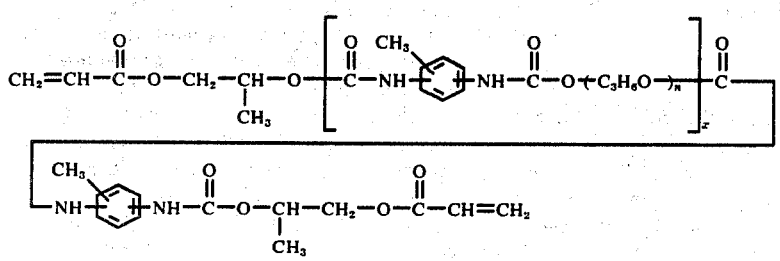

wherein x is about 1 and n is 21–25 will be referred to hereinafter as Polyene B.

To a 2 ounce glass jar was added 10 grams (0.0076 mole) of acrylate terminated Polyene B and 1.8 gram (0.0038 mole) of commercially available pentaerythritol tetrakis (mercaptopropionate). 0.5 gram of acetophenone as a photocuring rate accelerator was added to the mixture and the mixture was placed outdoors on a window ledge and exposed to UV radiation from the sun. After 15 minutes the mixture cured to a hard solid polythioether.

The following examples show the use of high energy radiation as the free radical generating agent.

EXAMPLE 20

4 moles of trimethylol propane triacrylate commercially available from Sartomer Resins, Inc. were admixed with 3 moles of pentaerythritol tetrakis ($\beta$-mercaptopropionate) commercially available from Carlisle Chemical Co. under the tradename "Q-43". The admixture was poured into a tray (3/16 inch thick layer) and was exposed to a swept beam from a 2 Mev Van de Graaff electron accelerator. The beam current was 195 microamperes, the scan width 12 inches and the pass rate 18.4 inches per minute. In a single pass (3 second exposure) giving a dose of 1.0 megarad, the admixture cured clear through to a smooth clear, colorless, very tough polythioether solid having a Shore D hardness of about 70 in 3 seconds.

In repeating the example except that the dosage was only 0.50 megarad (beam current 97.5 microamperes) equivalent results were obtained.

EXAMPLE 21

Example 20 (1 megarad dosage) was repeated except that the pentaerythritol tetrakis ($\beta$-mercaptopropionate) was omitted from the admixture. The resultant polymer product had a liquid top surface due to oxygen inhibition. When Example 21 was repeated using 0.5 megarad dosage, the admixture did not cure or give any evidence of thickening.

EXAMPLE 22

4 moles of trimethylol propane trimethacrylate commercially available from Sartomer Resins, Inc. were admixed with 3 moles of pentaerythritol tetrakis ($\beta$-mercaptopropionate) commercially available from Carlisle Chemical Co. under the tradename "Q-43". The admixture was poured into a tray (3/16 inch thick layer) and was exposed to a swept beam from a 2 Mev Van de Graaff electron accelerator. The beam current was 195 microamperes, the scan width 12 inches and the pass rate 18.4 inches per minute. In a single pass giving a dose of 1.0 megarad, the admixture cured clear through to a smooth clear, colorless, very tough, poly-thioether solid having a Shore D hardness of 75 in 3 seconds.

In repeating the example except that the dosage was only 0.50 megarads (beam current 97.5 microamperes) equivalent results were obtained.

EXAMPLE 23

Example 22 (1 megarad dosage) was repeated except that the pentaerythritol tetrakis ($\beta$-mercaptopropionate) was omitted from the admixture. The resultant polymer product had a liquid top surface due to oxygen inhibition. When Example 23 was repeated using 0.5 megarad dosage, the admixture did not cure or give any evidence of thickening.

EXAMPLE 24

2 moles of diethylene glycol diacrylate commercially available from Borden Chemical Co. were admixed with 1 mole of pentaerythritol tetrakis ($\beta$-mercaptopropionate) commercially available from Carlisle Chemical Co. under the tradename "Q-43". The admixture was poured into a tray (3/16 inch thick layer) and was exposed to a swept beam from a 2 Mev Van de Graaff electron accelerator. The beam current was 195 microamperes, the scan width 12 inches and the pass rate 18.4 inches per minute. In a single pass giving a dose of 1.0 megarad, the admixture cured clear through to a smooth clear, colorless, rubbery, polythioether solid having a Shore A hardness of about 70 in 3 seconds.

In repeating the example except that the dosage was only 0.50 megarads (beam current 97.5 microamperes) equivalent results were obtained.

EXAMPLE 25

Example 24 (1 megarad dosage) was repeated except that the pentaerythritol tetrakis ($\beta$-mercaptopropionate) was omitted from the admixture. The resultant polymer product had a liquid top surface due to oxygen inhibition. When Example 25 was repeated using 0.5 megarad dosage, the admixture did not cure or give any evidence of thickening.

EXAMPLE 26

2 moles of diethylene glycol dimethacrylate commercially available from Borden Chemical Co. were admixed with 1 mole of pentaerythritol tetrakis ($\beta$-mercaptopropionate) commercially available from Carlisle Chemical Co. under the tradename "Q-43". The admixture was poured into a tray (3/16 inch thick layer) and was exposed to a swept beam from a 2 Mev Van de Graaff electron accelerator. The beam current was 195 microamperes, the scan width 12 inches and the pass rate 18.4 inches per minute. In a single pass giving a dose of 1.0 megarad, the admixture cured clear through to a smooth clear, colorless, rubbery, polythioether solid having a Shore A hardness of about 60 in 3 seconds.

EXAMPLE 27

Example 26 (1 megarad dosage) was repeated except that the pentaerythritol tetrakis (β-mercaptopropionate) was omitted from the admixture. The resultant polymer product had a liquid top surface due to oxygen inhibition. When Example 27 was repeated using 0.5 megarad dosage, the admixture did not cure or give any evidence of thickening.

EXAMPLE 28

2 moles of commercially available divinyl benzene (62% solution in benzene) were admixed with 1 mole of pentaerythritol tetrakis (β-mercaptopropionate) commercially available from Carlisle Chemical Co. under the tradename "Q-43". The admixture was poured into a tray (40 mil thick layer) and was exposed to a swept beam from a 2 Mev Van de Graaff electron accelerator. The beam current was 49 microamperes, the scan width 12 inches and the pass rate 18.4 inches per minute in a single pass (3 second exposure) giving a dose of approximately 0.25 megarads no curing was observed. The beam current was increased to 195 microamperes and two additional passes were made causing the admixture to cure clear through to a smooth clear, colorless, rubbery solid having a Shore A hardness of about 55.

EXAMPLE 29

Example 28 was repeated except that the pentaerythritol tetrakis (β-mercaptopropionate) was omitted from the admixture and the total dosage was 8 megarads (1 megarad/pass). The admixture did not cure or give any evidence of thickening.

EXAMPLE 30

7.4 grams poly(oxyethyleneether) glycol diacrylate (MW about 370) commercially available from Sartomer Resins, Inc. under the tradename "SR210" were admixed with 4.1 grams of pentaerythritol tetrakis (β mercaptopropionate) commercially available from Carlisle Chemical Co. under the tradename "Q-43". The admixture (60 mils thick) was exposed to a swept beam from a 2 Mev Van de Graaff electron accelerator. The beam current was 195 microamperes, the scan width 12 inches and the pass rate 18.4 inches per minute. In a single pass (3 second exposure) giving a dose of approximately 1.0 megarads, the admixture cured clear through to a smooth clear, colorless, solid having a Shore A hardness of about 55.

In repeating the example except that the dosage was only 0.50 megarads (beam current 97.5 microamperes) equivalent results were obtained.

EXAMPLE 31

Example 30 (1 megarad dosage) was repeated except that the pentaerythritol tetrakis (β-mercaptopropionate) was omitted from the admixture. The resultant polymer product had a liquid top surface due to oxygen inhibition.

EXAMPLE 32

The admixture of Example 20 was coated on the following surfaces to a thickness of about 2 mils: aluminum, tin free steel, ceramic, brick, paper, leather, cinder bloc, polyvinyl chloride film, polyethylene terephthalate, glass, cotton fabric, non-woven glass mat, cellophane, plywood, and clay-coated paper board. The coated articles were exposed to a swept beam from a 2 Mev Van de Graaff electron accelerator. The beam current was 195 microamperes, the scan width 12 inches and the pass rate 18.4 inches per minute. In a single pass (3 second exposure) giving a dose of 1.0 megarad, a clear, colorless, tough, polythioether solid coating which adhered well to the substrates and imported to each a degree of water repellancy and soil resistance was obtained on every substrate.

The following examples show the use of a chemical free radical generating agent.

EXAMPLE 33

4 moles of trimethylol propane triacrylate commercially available from Sartomer Resins, Inc. were admixed in a aluminum dish with 3 moles of pentaerythritol tetrakis (β-mercaptopropionate) commercially available from Carlisle Chemical Co. under the tradename "Q-43", 1.2% by weight of the admixture of benzoyl peroxide (as a 10% solution in benzene) and 1.2% by weight of dimethyl aniline. The admixture (½ inch depth) cured clear through to a smooth, clear, tack free, colorless rubbery polythioether product in 1 minute under ambient conditions. The reaction exhibited an exotherm up to 92° C. The cured product had a Shore A hardness of 50.

EXAMPLE 34

Example 33 was repeated except that the pentaerythritol tetrakis (β-mercaptopropionate) was omitted from the admixture. The admixture required an initiation period of 12 minutes before curing started and an additional 4 minutes to complete curing. The reaction exotherm carried the temperature to 170° C and fumes were observed. The resultant product was a tan colored, opaque, brittle, crumbly foam.

A comparison of Examples 33 and 34 shows the superiority of the curing reaction accomplished by the use of the polythiol-containing composition of this invention. The reaction is smoother, faster and conveniently carried out even in the presence of air (oxygen).

EXAMPLE 35

4 moles of trimethylol propane trimethacrylate commercially available from Sartomer Resins, Inc. were admixed in an aluminum dish with 3 moles of pentaerythritol tetrakis (β-mercaptopropionate) commercially available from Carlisle Chemical Co. under the tradename "Q-43", 1.2% by weight of the admixture of benzoyl peroxide (as a 10% solution in benzene) and 1.2% by weight of dimethyl aniline. The admixture one-half inch depth) cured clear through to a smooth, clear, colorless, fairly hard and strong, tack free, polythioether product in 3 minutes under ambient conditions. The reaction exhibited an exotherm up to 86° C. The cured product had a Shore A hardness of 72.

EXAMPLE 36

Example 35 was repeated except that the pentaerythritol tetrakis (β-mercaptopropionate) was omitted from the admixture. The admixture hardened slowly over a 1 hour period. The resultant product was greenish black colored, and transparent, and had liquid top and bottom surfaces.

EXAMPLE 37

2 moles of diethylene glycol diacrylate commercially available from Borden Chemical Co. were admixed in an aluminum dish with 1 mole of pentaerythritol tetrakis ($\beta$-mercaptopropionate) commercially available from Carlisle Chemical Co. under the tradename "Q-43", 1.2% by weight of the admixture of benzoyl peroxide (as a 10% solution in benzene) and 1.2% by weight of dimethyl aniline. The admixture (½ inch depth) cured clear through to a smooth, clear, colorless rubbery, tack free polythioether product in 1 minute under ambient conditions. The reaction exhibited an exotherm up to 92° C. The cured product had a Shore A hardness of 50.

EXAMPLE 38

Example 37 was repeated except that the pentaerythritol tetrakis ($\beta$-mercaptopropionate) was omitted from the admixture. The admixture required an initiation period of 1.5 minutes before curing started and an additional 1 minute to complete curing. The reaction exotherm carried the temperature to 105° C and fumes and smoke were observed. The resultant product was a bright orange colored, opaque, brittle, crumbly foam.

EXAMPLE 39

2 moles of diethylene glycol dimethacrylate commercially available from Borden Chemical Co. were admixed in an aluminum dish with 1 mole of pentaerythritol tetrakis ($\beta$-mercaptopropionate) commercially available from Carlisle Chemical Co. under the tradename "Q-43", 1.2% by weight of the admixture of benzoyl peroxide (as a 10% solution in benzene) and 1.2% by weight of dimethyl aniline. The admixture (½ inch depth) cured clear through to a smooth, clear, tack free, colorless rubbery polythioether product in 1 minute under ambient conditions after a 2 minute initiation period. The reaction exhibited an exotherm up to 80° C. The cured product had a Shore A hardness of 55.

EXAMPLE 40

Example 39 was repeated except that the pentaerythritol tetrakis ($\beta$-mercaptopropionate) was omitted from the admixture. The admixture required an initiation period of 4 minutes before curing started and an additional 1 minute to complete curing. The reaction exotherm carried the temperature to 120° C and fumes and smoke were noted. The resultant product was a bright orange colored, opaque, brittle, crumbly foam.

EXAMPLE 41

2 moles of commercially available divinyl benzene (62% solution in benzene) were admixed in an aluminum dish with 1 mole of pentaerythritol tetrakis ($\beta$-mercaptopropionate), 1.2% by weight of the admixture of benzoyl peroxide (as a 10% solution in benzene) and 1.2% by weight of dimethyl aniline. Under ambient conditions, the admixture (½ inch depth) cured clear through to a clear, colorless, rubbery solid having a Shore A hardness of 55 in 120 minutes.

EXAMPLE 42

7.4 grams poly(oxyethyleneether) glycol diacrylate (M.W. about 370) commercially available from Sartomer Resins, Inc. under the tradename "SR 210" was mixed in an aluminum dish with 4.9 g. pentaerythritol tetrakis ($\beta$-mercaptopropionate), 1.2% by weight of the admixture of benzoyl peroxide (10% solution in benzene) and 1.0% by weight of dimethyl aniline. After 4 minutes, the admixture (three-eighth inch depth) cured clear through to a smooth, clear, colorless, polythioether product which was essentially tack free.

EXAMPLE 43

2 moles of trimethylol propane triacrylate commercially available from Sartomer Resins, Inc. were admixed in an aluminum dish with 3 moles of ethyleneglycol bis ($\beta$-mercaptopropionate) commercially available from Carlisle Chemical Co. under the tradename "E-23", 1.2% by weight of the admixture of benzoyl peroxide (10% solution in benzene) and 1.2% by weight of dimethyl aniline. In about 2 minutes, the admixture (one-half inch depth) cured clear through to a clear, colorless, tack free, polythioether solid.

EXAMPLE 44

2 moles of diethylene glycol diacrylate were admixed in an aluminum dish with 1 mole of pentaerythritol tetrakis ($\beta$-mercaptopropyl) ether and 1% by weight of the admixture of azobisisobutyronitrile. A three-sixteenth inch thick layer of the admixture was placed in a circulating air oven maintained at 70° C. The admixture cured clear through to a smooth, clear colorless, tack free, polythioether solid having a Shore A hardness of 50 in less than 2 minutes.

EXAMPLE 45

1 mole of trimethylol propane trimethacrylate was admixed in an aluminum dish with 1 mole of tris ($\beta$-mercaptopropionate) ester of tris (2-hydroxyethyl) isocyanaurate and 1% by weight of the admixture of azobisisobutyronitrile. A 3/16 inch thick layer of the admixture was placed in a circulating air oven maintained at 70° C. The admixture cured clear through to a smooth, clear, colorless, tack free, polythioether solid in 5 minutes.

EXAMPLE 46

The admixture of Example 33 was coated on the following surfaces to a thickness of about 2 mils: aluminum, tin free steel, ceramic, brick, paper, leather, cinder block, polyvinyl chloride film, polyethylene tetephthalate, glass, cotton fabric, non-woven glass mat, cellophane, plywood, and clay-coated paper broad. Within 1 minute a clear, colorless, smooth, tack free, crosslinked, solid, polythioether coating which adhered well to the substrates and imported to each a degree of water repellancy and soil resistance was obtained.

The solid cured polythioether polymer products resulting from the instant invention have many and varied uses. Examples of some uses include but are not limited to adhesives; caulks; elastomeric sealants; coatings; encapsulating or potting compounds; liquid castable elastomers; thermoset resins; impregnants for fabric, cloth, fibrous webs and other porous substrates; laminating adhesives and coatings; mastics; glazing compounds; photoresists; fiberglass reinforced composites; sizing or surface finishing agents, filleting compounds; cure in place gasketing compounds; rocket fuel binders; filaments and fibers; foamable thermosetting resins or elastomers; molded articles such as gaskets, diaphragms, balloons; automobile tires, etc.

The molecular weight of the polyenes of the present invention may be measured by various conventional methods, including solution viscosity, osmotic pressure and gel permeation chromatography. Additionally, the molecular weight may be calculated from the known molecular weight of the reactants.

The viscosity of the polythiols may be measured on a Brookfield Viscometer at 30°, 70° or 150° C in accord with the instructions therefor.

The components to be cured may be prepared as either single-packaged or multi-packaged liquid polymer systems which may be cured to solid polythioether elastomers or resins without liberating gaseous by-products which cause bubbles and voids in the vulcanizate. Thus, there is provided curable polymer systems composed of particular polyenes and polythiols in which the components individually are storage stable and which are not sensitive to or deteriorated by traces of moisture or oxygen containing gas such as may be encountered during normal storage or handling procedures. Solid resinous or elastomeric products may be prepared from flowable liquids in a system in which the rate of curing may be inhibited or retarded by the use of chemical inhibitors, antioxidants, inert atmospheres and the like. The cured product may be characterized as thermally and oxidatively stable.

As used herein the term polyene refers to single or complex species of organic compounds, liquid at 70° C or below, having a multiplicity of vinyl addition polymerizable carbon-to-carbon unsaturated functional groups per average molecule. For purposes of brevity all these classes of compounds are referred to hereafter as polyenes.

In defining the position of the vinyl addition polymerizable carbon-to-carbon unsaturation, the term terminal is intended to mean that functional unsaturation is at an end of the main chain in the molecule; whereas by near terminal is intended to mean that the functional unsaturation is not more than 10 carbon atoms and typically less than 8 carbon atoms from an end of the main chain in the molecule. The term pendant means that the reactive carbon-to-carbon unsaturation is located terminal or near-terminal in a branch of the main chain as contrasted to a position at or near the ends of the main chain. For purposes of brevity all of these positions are referred to herein generally as terminal unsaturation.

Functionality as used herein refers to the average number of ene or thiol groups per molecule in the polyene or polythiol, respectively. For example, a triene is a polyene with an average of three reactive carbon-to-carbon unsaturated groups per molecule and thus has a functionality (f) of three. A dithiol is a polythiol with an average of two thiol groups per molecule and thus has a functionality (f) of two.

It is to be understood that the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100% of the theoretical value for complete reaction, the functionality (assuming 100% pure starting materials) would be 2.0. If however, the reaction were carried to only 90% of theory for complete reaction, about 10% of the molecules present would have only one ene functional group, and there may be a trace of material that would have no ene functional groups at all. Approximately 90% of the molecules, however, would have the desired diene structure and the product as a whole then would have an actual functionality of 1.9. Such a product is useful in the instant invention and is referred to herein as having a functionality of 2.

The term reactive unsaturated carbon-to-carbon groups means groups which will react under proper conditions as set forth herein with thiol groups to yield the thioether linkage

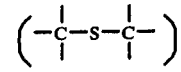

as contrasted to the term unreactive carbon-to-carbon unsaturation which means

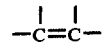

groups found in aromatic nucleii (cyclic structures exemplified by benzene, pyridine, anthracene, and the like) which do not under the same conditions react with thiols to give thioether linkages.

Highly water-sensitive groups are intended to include, for example, isocyanate, acylhalide such as acylchloride, anhydride and the like which readily react with water, alcohols, ammonia, amines and the like.

Odorless has been used herein to mean the substantial absence of the well-known offensive and sometimes obnoxious odors that are characteristic of hydrogen sulfide and the derivative family of compounds known as mercaptans.

In all the curable systems herein, the compositions consists of 2 to 98 parts by weight of a polyene containing molecule and 98 to 2 parts by weight of a polythiol containing at least 2 thiol groups per molecule. The photocuring rate accelerator is present in an amount ranging from about 0.0005 to about 50 parts by weight of the polyenepolythiol composition.

The polyenes having at least two vinly addition polymerizable groupings per average molecule of the instant invention are numerous and varied. The include but are not limited to methacrylic, acrylic, cinnamic and crotonic acid diesters of alkylene glycols and the poly(alkyleneether) glycols, such as diethylene glycol; tripropylene glycol, tetrabutylene glycol, etc., or mixtures of those ether alcohols; crotonic, cinnamic, methacrylic and acrylic acid diesters of polymethylene glycols such as trimethylene glycol, hexamethylene glycol, etc; acrylic or substituted acrylic-terminated polyether or polyester polyurethanes or polyurethaneureas formed by reaction of appropriate isocyanate-terminated polyfunctional moieties or prepolymers with hydroxyalkyl esters of acrylic acid, methacrylic acid, crotonic acid and cinnamic acid; the reaction products of oxirane terminated epoxy resins with the anhydrides, acylhalides or amides derived from acrylic acid, methacrylic acid, crotonic acid, cinnamic acid and with hydroxyalkyl esters of acrylic acid, methacrylic acid, crotonic acid and cinnamic acid. More specific polyene examples include but are not limited to crotyl methacrylate, methylene bisacrylamide, 1,3 butylene glycol diacrylate, 1,4 butylene glycol diacrylate, diethylene glycol diacrylate, diethylene glycol dimethacrylate, 1,6-hexane diol diacrylate, pentaerythritol tetraacrylate, bisphenol A dimethacrylate N,N'-di(hydroxyethyl)dimethylhydantoin diacrylate, polyethylene glycol (200)diacrylate, triethylene glycol diacrylate, trimethylolpropane triacrylate, allyl methacrylate, 1,3 butylene glycol dimethacrylate, ethylene glycol dimethacrylate, polyethylene glycol dimethacrylate, tetraethylene glycol dimethacrylate, triethylene glycol dimethacrylate, and trimethylol propane trimethacrylate, trimethylolpropane tricrotonate, diethylene glycol dicinnamate. Acrylates ad acrylamides with two or more sites of unsaturation useful as polyenes in this invention can be formed by the reaction of aliphatic, aromatic, alicyclic or heterocyclic alcohols or amines having two or more hydroxy groups or amino groups with acrylic acid, at atmospheric or superatmospheric pressures and temperatures from 50°–200° C, optionally using effective reaction catalysts such as p-toluene sulfonic acid, zinc chloride and the like.

In the liquid polyene component of the formula
wherein $m$ is an integer of at least 2, X is

$$-\overset{O}{\underset{}{C}}-\overset{R}{\underset{}{C}}=\overset{R}{\underset{}{C}}-R$$

and A is a polyvalent organic moiety, free of reactive carbon to carbon unsaturation and of highly water-sensitive members and consisting of atoms selected from the group consisting of carbon, hydrogen, oxygen, nitrogen, chlorine, bromine, fluorine, phosphorous and silicon; and R is a radical selected from the group consisting of hydrogen, phenyl and an alkyl containing 1 to 9 carbon atoms; X is connected to A by a member of the group consisting of —O—, as shown in various examples including Example 18, and

wherein the polyene is methylene bisacrylamide.

The radiation of the curable compositions of the instant invention supplied by high energy ionizing radiation is preferably high energy particle or corpuscular irradiation. Although the examples, herein, used high energy irradiation, i.e., from a Van de Graaff electron accelerator, it should be understood that the present invention is not limited thereto. Irradiation employing particles in the instant invention includes the use of positive ions (e.g., protons, alpha particles and deuterons, (electrons or neutrons. The charged particles may be accelerated to high speeds by means of various voltage gradient mechanisms such as a Van de Graaff generator, a cyclotron, a Cockroft Walton accelerator, a resonant cavity accelerator, a betatron, a G.E. resonant transformer, a synchrotron or the like. Furthermore, particle irradiation may also be supplied from radioactive isotopes or an atomic pile. Radiation dosages operable in the instant invention range from 0.01 to 10 megarads.

It is understood that the foregoing detailed description is given merely by way of illustration and that many variations may be made therein without departing from the spirit of the invention.

What is claimed is:

1. A composition curable in the presence of a free radical generating agent comprising:

I. 98 to 2% by weight of the composition of a liquid polyene component of the formula
$[A]-(X)_m$
wherein $m$ is an integer of at least 2, X is

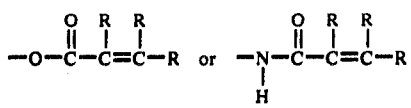

and A is a polyvalent organic moiety, free of reactive carbon to carbon unsaturation and of highly water-sensitive members and consisting of atoms selected from the group consisting of carbon, hydrogen, oxygen, nitrogen, chlorine, bromine, fluorine, phosphorous and silicon; and R is a radical selected from the group consisting of hydrogen, phenyl and an alkyl containing 1 to 9 carbon atoms; and, II. 2 to 98% by weight of the composition of a polythiol having a molecular weight in the range from about 95 to 20,000 of the general formula:

$$R_8(SH)_n$$

wherein $R_8$ is a polyvalent organic moiety and n is at least 2, the reactive unsaturated carbon to carbon bonds per molecule in the polyene and the thiol groups per molecule in the polythiol being greater than 4.

2. The composition of claim 1 including 0.0005 to about 50% by weight of the polyene/polythiol composition of a photocuring rate accelerator.

3. The composition of claim 1 wherein the polyene is a member of the group consisting of methylene bisacrylamide 1,3 butylene glycol diacrylate, 1,4 butylene glycol diacrylate, diethylene glycol diacrylate, diethylene glycol dimethacrylate, 1,6-hexane diol diacrylate, pentaerythritol tetraacrylate, bisphenol A dimethacrylate, N,N'-di(hydroxyethyl)dimethylhydantoin diacrylate, polyethylene glycol (200) diacrylate, triethylene glycol diacrylate, trimethylolpropane triacrylate, bisphenol A diacrylate, 1,3 butylene glycol dimethacrylate, ethylene glycol dimethacrylate, polyethylene glycol dimethacrylate, tetraethylene glycol dimethacrylate, triethylene glycol dimethacrylate, and trimethylol propane trimethacrylate, trimethylolpropane tricrotonate, and diethylene glycol dicinnamate.

4. The composition according to claim 1 wherein the polyene is the reaction product of an isocyanate terminated prepolymer or isocyanate monomer with a hydroxyalkyl ester of a member of the group consisting of acrylic acid, methacrylic acid, crotonic acid and cinnamic acid.

5. The composition according to claim 1 wherein the polyene is the reaction product of an oxirane terminated epoxy resin with a member of the group consisting of anhydride, acrylhalide amide and hydroxyalkyl ester of an acid member of the group consisting of acrylic, methacrylic, crotonic and cinnamic.

6. A process of forming a solid cured polythioether wich comprises
1. admixing a composition comprising:
I. 98 to 2% by weight of the composition of a liquid polyene component of the formula

$[A]-(X)_m$
wherein $m$ is an integer of at least 2, X is

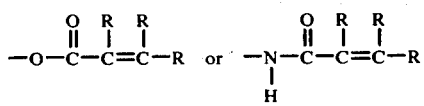

and A is a polyvalent organic moiety free of reactive carbon to carbon unsaturation and of highly water-sensitive members and consisting of atoms selected from the group consisting of carbon, hydrogen, oxygen, nitrogen, chlorine, bromine, fluorine, phosphorous and silicon; and R is a radical selected from the group consisting of hydrogen, phenyl and an alkyl containing 1 to 9 carbon atoms;

II. 2 to 98% by weight of the composition of a polythiol having a molecular weight in the range from about 94 to 20,000 of the general formula:

wherein $R_8$ is a polyvalent organic moiety and $n$ is at least 2, the reactive unsaturated carbon to carbon bonds per molecule in the polyene and the thiol groups per molecule in the polythiol being greater than 4, and 2. exposing the mixture to a free radical generating agent.

7. The process according to claim 6 wherein the free radical generating agent is high energy radiation.

8. The process according to claim 6, wherein the free radical generating agent is a chemical free radical generating agent.

9. The process of claim 8 wherein the chemical free radical generating agent is selected from the group consisting of molecular oxygen; organic hydroperoxides and peroxides; blends of organic hydroperoxides and peroxides with tertiary amines; blends of organic hydroperoxies and peroxides with transition metal salts and blends or organic hydroperoxides and peroxides with tertiary amines and transition metal salts.

10. The process according to claim 6 wherein the composition includes 0.0005 to about 50% by weight of the polyene/polythiol composition of a photocuring rate accelerator.

11. The process according to claim 10 wherein the free radical generating agent is U. V. light.

12. The process according to claim 6 wherein the polyene is a member of the group consisting of methylene bisacrylamide 1,3 butylene glycol diacrylate, 1,4 butylene glycol diacrylate, diethylene glycol diacrylate, diethylene glycol dimethacrylate, 1,6-hexane diol diacrylate; pentaerythritol tetraacrylate, bisphenol A dimethacrylate, N,N'-di(hydroxyethyl)dimethylhydantoin diacrylate, polyethylene glycol (200) diacrylate, triethylene glycol diacrylate, trimethylolpropane triacrylate, bisphenol A diacrylate, 1,3 butylene glycol dimethacrylate, ethylene glycol dimethacrylate, polyethylene glycol dimethacrylate, tetraethylene glycol dimethacrylate, triethylene glycol dimethacrylate, and trimethylol propane trimethacrylate, trimethylolpropane tricrotonate, and diethylene glycol dicinnamate.

13. The solid polythioether product prepared by the process of claim 6.

14. A sealant consisting essentially of the composition of claim 1.

15. An adhesive consisting essentially of the composition of claim 1.

16. The composition of claim 1 where X is acryloxy or methacryloxy.

17. The composition of claim 16 wherein X is acryloxy.

18. A composition capable of being crosslinked solely by radiation to form thioether groups between the carbon-to-carbon unsaturation of I and the thiol groups of II comprising:

I. 98 to 2% by weight of the composition of a liquid polyene component of the formula $[A]$$(X)_m$ wherein $m$ is an integer of at least 2, X is $$-\overset{O}{\underset{\|}{C}}-\overset{R}{\underset{|}{C}}=\overset{R}{\underset{|}{C}}-R$$

and A is a polyvalent organic moiety, free of reactive carbon to carbon unsaturation and of highly water-sensitive members and consisting of atoms selected from the group consisting of carbon, hydrogen, oxygen, nitrogen, chlorine, bromine, fluorine, phosphorous and silicon; and R is a radical selected from the group consisting of hydrogen, phenyl and an alkyl containing 1 to 9 carbon atoms; and, II. 2 to 98% by weight of the composition of a polythiol having a molecular weight in the range from about 95 to 20,000 of the general formula:

wherein $R_8$ is a polyvalent organic moiety and $n$ is at least 2, the reactive unsaturated carbon to carbon bonds per molecule in the polyene and the thiol groups per molecule in the polythiol being greater than 4.

19. A process of forming a solid cured polythioether which consists essentially of 1. admixing a composition consisting essentially of:
I. 98 to 2% by weight of the composition of a liquid polyene component of the formula $[A]$$(X)_m$ wherein $m$ is an integer of at least 2, X is $$-\overset{O}{\underset{\|}{C}}-\overset{R}{\underset{|}{C}}=\overset{R}{\underset{|}{C}}-R$$

and A is a polyvalent organic moiety free of reactive carbon to carbon unsaturation and of highly water-sensitive members and consisting of atoms selected from the group consisting of carbon, hydrogen, oxygen, nitrogen, chlorine, bromine, fluorine, phosphorous and silocon; and R is a radical selected from the group consisting of hydrogen, phenyl and an alkyl containing 1 to 9 carbon atoms;

II. 2 to 98% by weight of the composition of a polythiol having a molecular weight in the range from about 94 to 20,000 of the general formula:

$R_8$$(SH)_n$ wherein $R_8$ is a polyvalent organic moiety and n is at least 2, the reactive unsaturated carbon to carbon bonds per molecule in the polyene and the thiol groups per molecule in the polythiol being greater than 4, and 2. exposing the mixture to a free radical generating agent.

* * * * *

UNITED STATES PATENT AND TRADEMARK OFFICE
CERTIFICATE OF CORRECTION

PATENT NO. : 4,008,341
DATED : February 15, 1977
INVENTOR(S) : Clifton L. Kehr

It is certified that error appears in the above–identified patent and that said Letters Patent are hereby corrected as shown below:

In Claim 9, column 23, line 37; delete the word "or" and insert therefor the word --of--.

Signed and Sealed this

Twelfth Day of April 1977

[SEAL]

Attest:

RUTH C. MASON
Attesting Officer

C. MARSHALL DANN
Commissioner of Patents and Trademarks